(12) United States Patent
Jones et al.

(10) Patent No.: US 11,987,303 B2
(45) Date of Patent: May 21, 2024

(54) TRACK SHOE WITH LARGE CAVITIES ON GROUND ENGAGING SURFACES HAVING A PROTRUDING SIDEWALL OR AN OVAL PERIMETER

(71) Applicant: Caterpillar Inc., Peoria, IL (US)

(72) Inventors: Benjamin Isaac Jones, Bartonville, IL (US); Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 398 days.

(21) Appl. No.: 17/201,408

(22) Filed: Mar. 15, 2021

(65) Prior Publication Data

US 2022/0289321 A1  Sep. 15, 2022

(51) Int. Cl.
*B62D 55/21* (2006.01)
*B62D 55/20* (2006.01)
*B62D 55/26* (2006.01)

(52) U.S. Cl.
CPC .......... *B62D 55/21* (2013.01); *B62D 55/202* (2013.01); *B62D 55/26* (2013.01)

(58) Field of Classification Search
CPC ...... B62D 55/20; B62D 55/202; B62D 55/21; B62D 55/26
See application file for complete search history.

(56) References Cited

U.S. PATENT DOCUMENTS

| | | | | |
|---|---|---|---|---|
| 2,452,921 A | | 11/1948 | Gillespie | |
| 2,530,379 A | * | 11/1950 | Davidson | B62D 55/12 305/196 |
| 3,847,451 A | * | 11/1974 | Freedy | B62D 55/28 305/191 |
| 4,176,887 A | * | 12/1979 | Alpers | B62D 55/15 305/202 |
| 4,433,874 A | * | 2/1984 | Melvin | B62D 55/205 72/120 |
| 9,409,613 B2 | | 8/2016 | Hakes | |
| 9,738,334 B2 | | 8/2017 | Talbot | |
| 2003/0034690 A1 | * | 2/2003 | Hori | B62D 55/275 305/191 |
| 2017/0275717 A1 | | 9/2017 | Saad | |
| 2018/0319448 A1 | | 11/2018 | Acosta et al. | |
| 2019/0283818 A1 | | 9/2019 | Jones, Jr. | |
| 2019/0283819 A1 | | 9/2019 | Jones | |
| 2020/0223501 A1 | | 7/2020 | Jones | |

FOREIGN PATENT DOCUMENTS

| | | |
|---|---|---|
| CN | 102001368 A | 4/2011 |
| CN | 203427923 U | 2/2014 |

* cited by examiner

*Primary Examiner* — S. Joseph Morano
*Assistant Examiner* — Emily G. Castonguay (57) ABSTRACT

A track pad includes a shoe member that has two bottom voids extending upwardly from the ground engaging surface of the shoe member, and which form a central support pillar having a serpentine surface laterally on side of the central support pillar, and another serpentine surface laterally on the other side of the central support pillar. The two bottom voids form oval perimeters at the ground engaging surface.

20 Claims, 7 Drawing Sheets

TRACK SHOE WITH LARGE CAVITIES ON GROUND ENGAGING SURFACES HAVING A PROTRUDING SIDEWALL OR AN OVAL PERIMETER

TECHNICAL FIELD

The present disclosure relates to track pads used in track chains for heavy equipment using endless track drives. Specifically, the present disclosure relates to track pad geometry suitable for use on hard surfaces.

BACKGROUND

In many current applications, track chain members such as track links or track shoes, or track pads, are attached to each other using a pin that allows the track chain members to rotate relative to each other while still allowing the chain to remain in tension when installed on the undercarriage of a track type vehicle. For heavy equipment, such as electric rope shovels and the like, track pads which incorporates the track rail and track shoe in a single, unitary body are used. In some applications the track pads are required to support the heavy load of the machine on hard surfaces such as rock and the like.

Due to the rigidity of hard surfaces such as rock and the like, the track pad may develop cracks, or experience "toenailing" (elongation of the track pad along the direction of travel) necessitating repair due to the heavy loads exerted on the track pad.

Various track pad geometries are known in the art including the track pad geometry disclosed in U.S. Pat. Application Publication No. 2019/0283819 to the assignee of the present application. The '819 application discloses a pair of cavities that extend from the ground supporting surface of the track shoe portion of the track pad, providing a central support pillar that conveys most of the load of the machine through the track pad to the ground.

However, there is a need to develop a track pad when used on hard surfaces that is more robust and cost effective to manufacture than has heretofore been devised.

SUMMARY

A track chain member according to an embodiment of the present disclosure may comprise a shoe member defining a track chain traveling direction, a lateral direction perpendicular to the track chain traveling direction, and a vertical direction that is perpendicular to the track chain traveling direction, and the lateral direction. The shoe member may further define a first lateral end, a second lateral end, and a ground engaging surface spanning from the first lateral end to the second lateral end. Also, the track chain member may further define a midplane along the lateral direction, a first bottom void extending from the ground engaging surface and a second bottom void extending from the ground engaging surface, the first bottom void being disposed on one side laterally of the midplane and the second bottom void being disposed on the other side laterally of the midplane, forming a support pillar therebetween. The first bottom void may at least partially form a first pillar sidewall, and the second bottom void may at least partially form a second pillar sidewall in a cross-sectional plane having the lateral and the vertical directions. The first pillar sidewall may include a convex blend that extends vertically from the ground engaging surface, and a concave blend that extends vertically from the convex blend.

A track chain member according to another embodiment of the present disclosure may comprise a shoe member defining a track chain traveling direction, a lateral direction perpendicular to the track chain traveling direction, and a vertical direction that is perpendicular to the track chain traveling direction, and the lateral direction. The shoe member may further define a first lateral end, a second lateral end, and a ground engaging surface spanning from the first lateral end to the second lateral end. The track chain member also define a midplane along the lateral direction, a first bottom void extending from the ground engaging surface and a second bottom void extending from the ground engaging surface, the first bottom void being disposed on one side laterally of the midplane, and the second bottom void being disposed on the other side laterally of the midplane, forming a support pillar therebetween. At least the first bottom void may define an oval perimeter at the ground engaging surface.

A track pad according to an embodiment of the present disclosure may comprise a first link portion defining a Y-shaped set of lugs each defining a bore with a cylindrical axis that is parallel to each other, and a shoe member portion extending from the first link portion, downward along a vertical direction that is perpendicular to each cylindrical axis toward a ground engaging surface. The ground engaging surface may extend along a lateral direction that is parallel to each cylindrical axis to form a first lateral extremity, and a second lateral extremity. The ground engaging surface may also define a midplane disposed laterally halfway between the first lateral extremity, and the second lateral extremity, a first bottom void defining a first lateral contour and a second lateral contour in a cross-sectional plane including the lateral direction, and the vertical direction, the first lateral contour being disposed proximate to the first lateral extremity, and the second lateral contour being disposed near the midplane. The first lateral contour may define a first vertical undercut, while the second lateral contour may define a second vertical undercut that is disposed at a vertical level higher than the first vertical undercut. Also, the first vertical undercut may define a first undercut lateral width, while the second vertical undercut may define a second lateral undercut width that is greater than the first lateral undercut width.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a track chain member, such as a track pad, and a track chain that may use a plurality of track chain members according to various embodiments of the present disclosure, etc. First, a machine that may use such track chain members (e.g., a track pad) or such track chains will be discussed.

Figure 1:
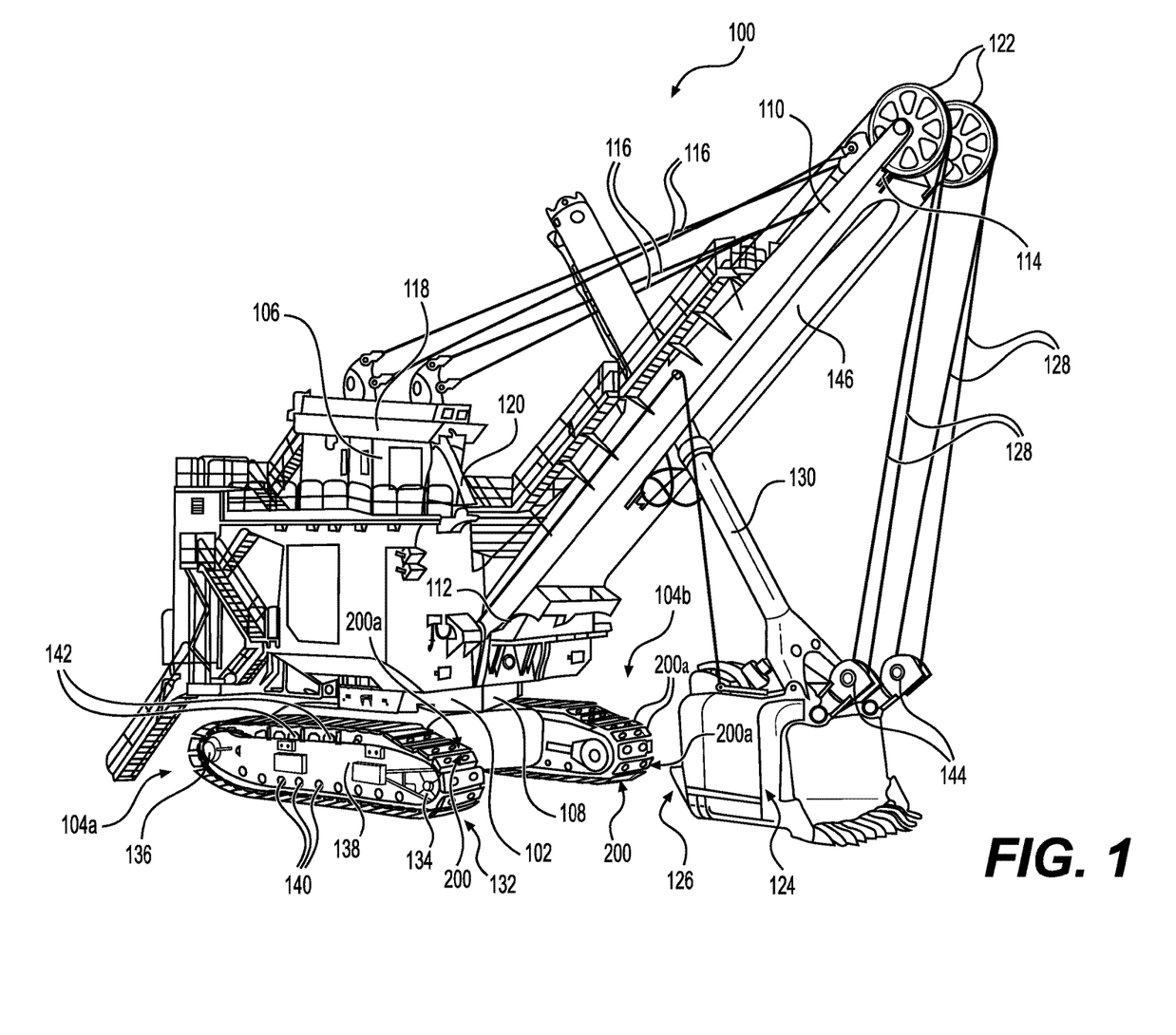
FIG. 1 is a perspective view of a machine such as an electric rope shovel that has track chains that use track pad or a track shoe according to an embodiment of the present disclosure.

Referring to FIG. 1, there is shown a machine 100 having a carbody 102 (may include a turntable 108) with a track system including a first track chain 104a and a second track chain 104b positioned at opposite sides of carbody 102. Machine 100 is shown in the context of an electric rope shovel having an operator cab 106, a boom 110, a lower end 112 of the boom 110 (also called a boom foot), an upper end 114 of the boom 110 (also called a boom point), tension cables 116, a gantry tension member 118, a gantry compression member 120, a sheave 122 rotatably mounted on the upper end 114 of the boom 110, a dipper bucket 124, a dipper door 126 pivotally coupled to the dipper bucket 124, a hoist rope 128, a winch drum (not shown), and a dipper handle 130. An electric motor controls the winch drum, causing the lower or raising of the boom, dipper bucket, and upward and downward movement of the dipper handle relative to the boom.

Tracks 104a and 104b are part of a machine undercarriage 132 coupled with carbody 102 in a conventional manner. Each of tracks 104a and 104b include a plurality of coupled together track shoes forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 may also be associated with each of tracks 104a and 104b to support and guide the tracks opposite rollers 140 during operation.

The unique design of tracks 104a and 104b and the overall track and undercarriage system of which they are a part are contemplated to enable machine 100 to operate in certain environments such as hard underfoot conditions without the shortcomings associated with many earlier designs. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of hydraulic shovel, bull dozer, excavator, back hoe, etc.

The dipper bucket 124 is suspended from the boom 110 by the hoist rope 128. The hoist rope 128 is wrapped over the sheave 122 and attached to the dipper bucket 124 at a bail 144. The hoist rope 128 is anchored to the winch drum (not shown). The winch drum is driven by at least one electric motor (not shown) that incorporates a transmission unit (not shown). As the winch drum rotates, the hoist rope 128 is paid out to lower the dipper bucket 124 or pulled in to raise the dipper bucket 124. The dipper handle 130 is also coupled to the dipper bucket 124. The dipper handle 130 is slidably supported in the saddle block 146, and the saddle block 146 is pivotally mounted to the boom 110 at the shipper shaft (not clearly shown). The dipper handle 130 includes a rack and tooth formation thereon that engages a drive pinion (not shown) mounted in the saddle block 146. The drive pinion is driven by an electric motor and transmission unit (not shown) to extend or retract the dipper handle 130 relative to the saddle block 146.

An electrical power source (not shown) is mounted to the carbody 102 to provide power to a hoist electric motor (not shown) for driving the hoist drum, one or more crowd electric motors (not shown) for driving the crowd transmission unit, and one or more swing electric motors (not shown) for turning the turntable 108. In some cases, electric motor powers all of the moving components of the shovel. Each of the crowd, hoist, and swing motors is driven by its own motor controller, or is alternatively driven in response to control signals from a controller (not clearly shown).

The track chains 104a and 104b are considered to be well suited for work in hard underfoot conditions. To this end, the track chains 104a and 104b may be "high ground pressure" tracks, each having track members durable enough to support a relatively large weight of machine 100. Each of track shoe members has a footprint defined in part by front and back edges, and also defined in part by outboard edges and. Each of track shoe members may further include a ground contact area that is equal to its footprint, or less than its footprint only to an extent that adjacent track shoes overlap one another or due to voids disposed on the bottom surface of the track shoe member.

Various track chain members that may be assemblies or unitary bodies that are constructed according to the principles of the present disclosure will now be discussed that may withstand high stress applications as just described.

Such a track chain member is depicted in FIGS. 2 thru 7. The track chain member 200a may include a shoe member (e.g., see shoe member portion 210) defining a track chain traveling direction 256, a lateral direction 216 that is perpendicular to the track chain traveling direction 256, and a vertical direction 212 (may be the same as the vertical direction of the machine in use) that is perpendicular to the track chain traveling direction 256, and the lateral direction 216. The shoe member further defines a first lateral end (e.g., see first lateral extremity 218), a second lateral end (e.g., see second lateral extremity 220), and a ground engaging surface 214 spanning from the first lateral end to the second lateral end.

The track chain member 200a may further define a midplane 222 along the lateral direction 216, as well as a first bottom void 224 extending vertically upwardly from the ground engaging surface 214, and a second bottom void 244 extending vertically upwardly from the ground engaging surface 214. The first bottom void 224 is disposed on one side laterally of the midplane 222, while the second bottom void 244 disposed on the other side laterally of the midplane 222, forming a support pillar 246 between these voids.

Figure 7:
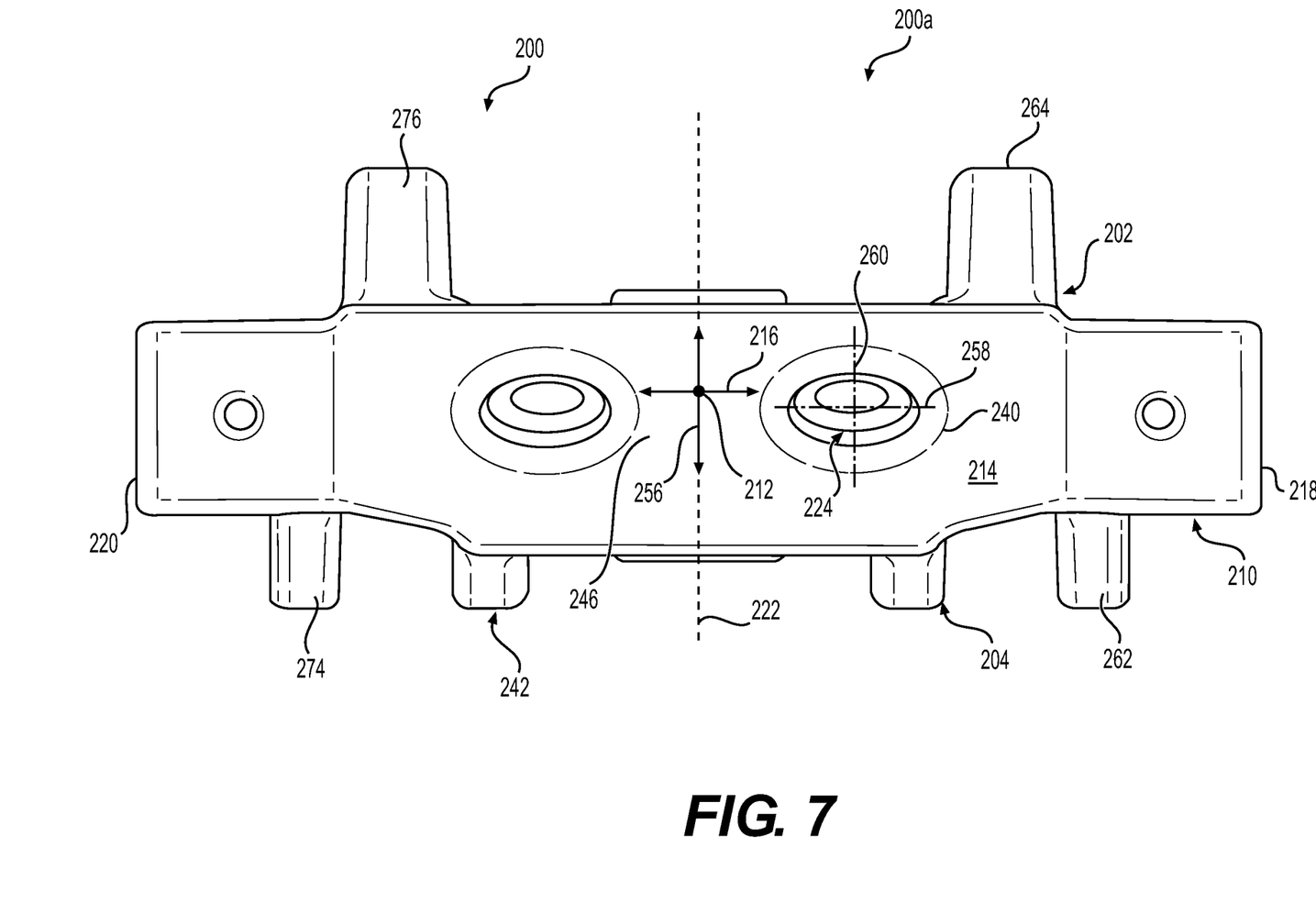
FIG. 7 is a bottom view of the track shoe or track pad of FIG. 2.

As best seen in FIG. 7, at least the first bottom void 224 (and possibly both voids) may define an oval perimeter 240 at the ground engaging surface 214. This may not be the case in other embodiments of the present disclosure. When present, the oval perimeter 240 (may also be referred to as an elliptical perimeter) of the first bottom void 224 may define a major axis 258 that runs parallel to the lateral direction 216, and a minor axis 260 that runs parallel to the track chain traveling direction 256. This may not be the case for other embodiments of the present disclosure. When present, the minor axis dimension may range from 120.0 mm to 140.0 mm (e.g., 131.6 mm), and the major axis dimension may range from 220.0 mm to 240.0 mm (e.g., 232.0 mm) in some embodiments. Other dimensional ranges are possible in other embodiments of the present disclosure.

Figure 3:
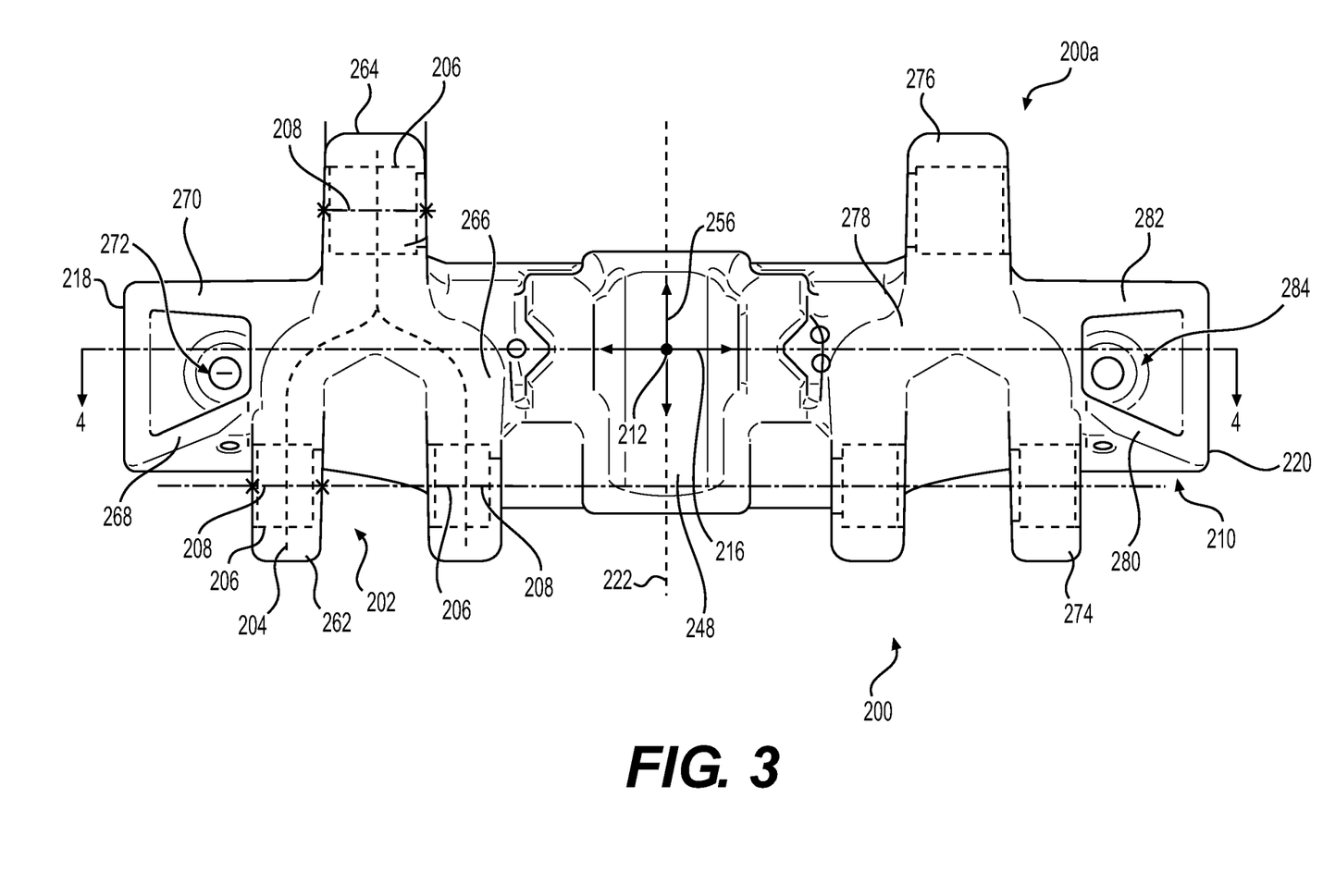
FIG. 3 is a top view of the track shoe or track pad of FIG. 2.

Focusing on FIG. 3, a first lug 262 may extend from the shoe member in a first direction parallel to the track chain traveling direction 256, while a second lug 264 may extending from the shoe member in a second direction parallel to the track chain traveling direction 256 and opposite to the first direction. A first top surface 266 may span from the first lug 262 to the second lug 264, while a first rib 268 may couple the shoe member to the first lug 262, and a second rib 270 may couple the shoe member to the second lug 264, defining a first side recess 272 between the first rib 268 and the second rib 270. The first side recess may also extend from the exterior of the shoe member and underneath the first top surface 266 (see also FIGS. 4 and 6).

As also best seen in FIG. 3, a third lug 274 (similar to the first lug 262) may extend from the shoe member in the first direction parallel to the track chain traveling direction 256, and a fourth lug 276 (similar to the second lug 264) extending from the shoe member in the second direction parallel to the track chain traveling direction 256 and opposite to the first direction. A second top surface 278 may span from the third lug 274 to the fourth lug 276, while a third rib 280 (similar to the first rib 268) couples the shoe member to the third lug 274, and a fourth rib 282 couples the shoe member to the fourth lug 276, defining a second side recess 284 that is disposed between the third rib 280 and the fourth rib 282. The second side recess 284 also extends from the exterior of the shoe member and underneath the second top surface 278 (see also FIGS. 4 and 6).

Figure 4:
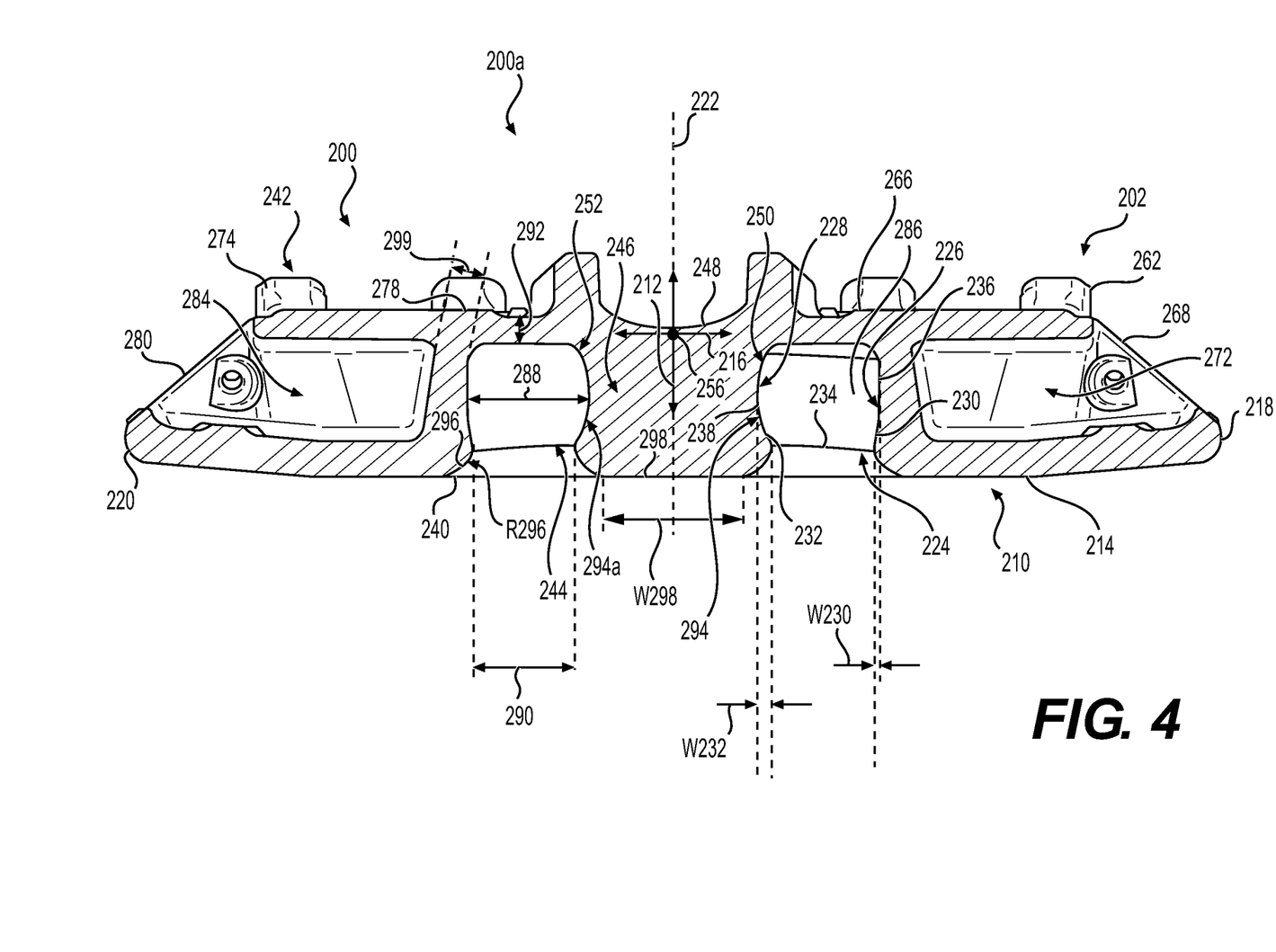
FIG. 4 is a rear cross-sectional view of the track shoe or track pad of FIG. 3 taken along lines 4-4 thereof.
Figure 5:
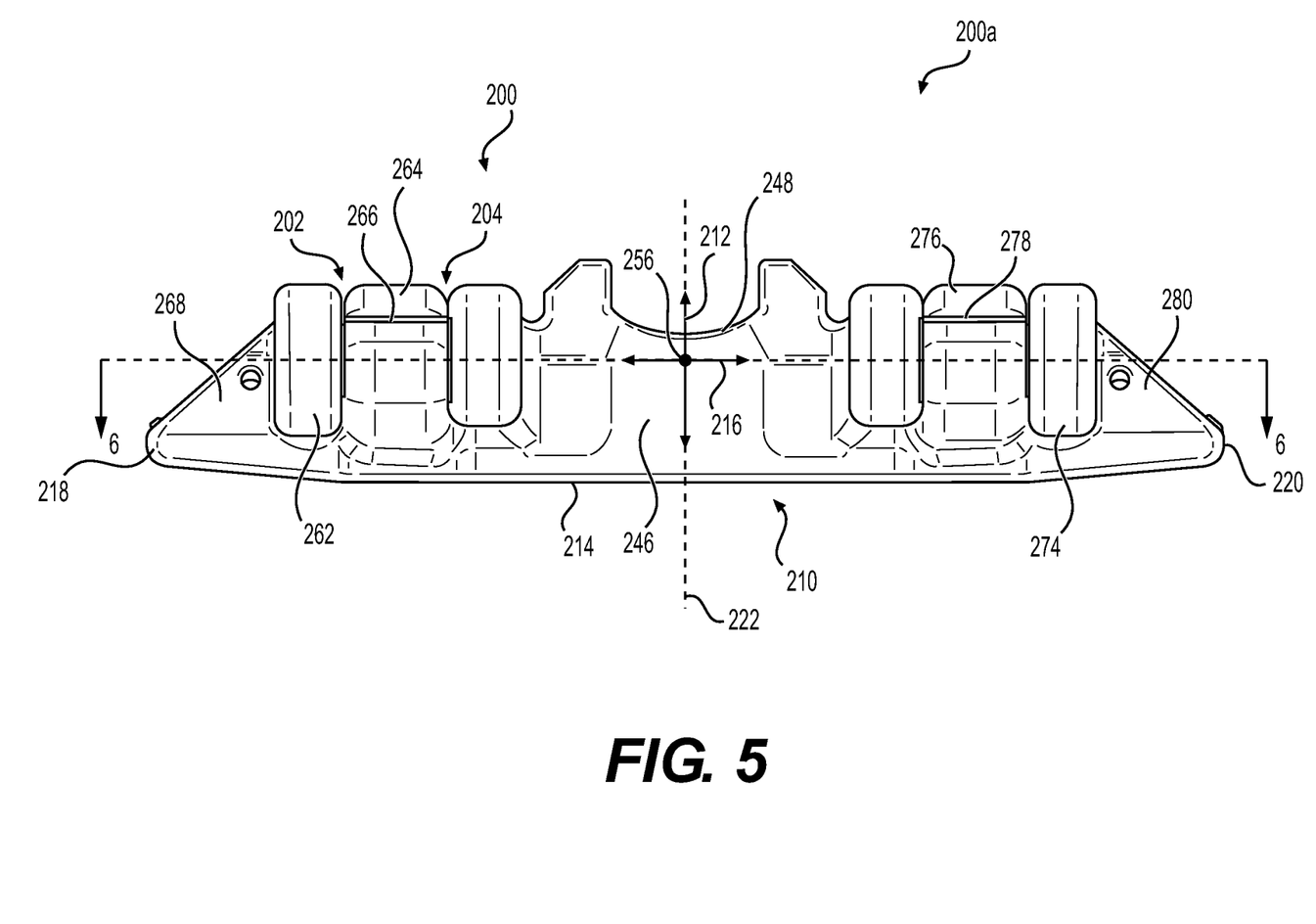
FIG. 5 is a rear view of the track shoe or track pad of FIG. 2.
Figure 6:
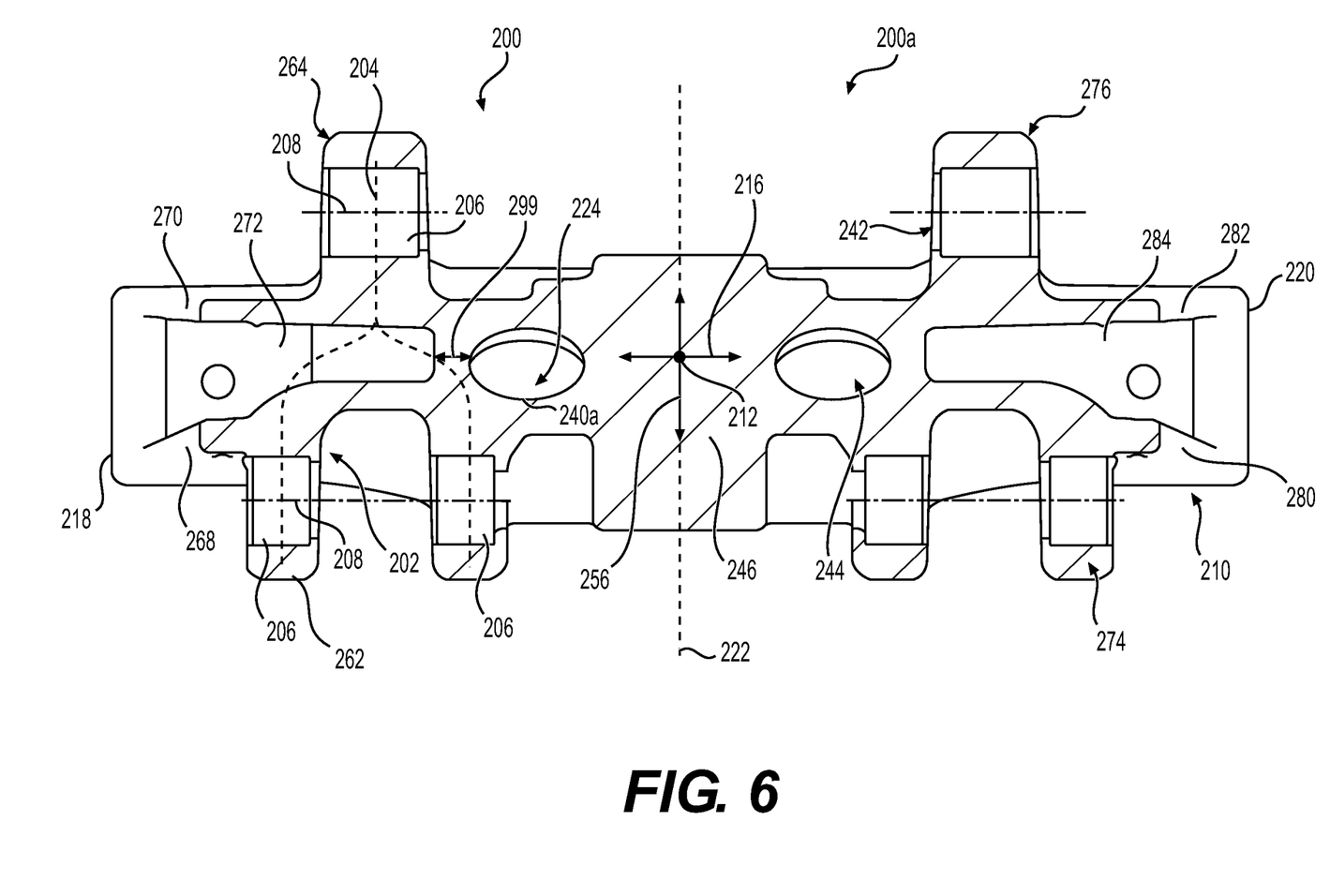
FIG. 6 is a top cross-sectional view of the track shoe or track pad of FIG. 5 taken along lines 6-6 thereof.

In FIG. 4, it can be seen that a first void sidewall 286 of the first bottom void 224 jogs laterally while extending vertically, forming an undercut (e.g., see 230 pr 232) along the vertical direction 212. Accordingly, the first bottom void 224 defines a maximum lateral width 288, while the undercut defines a minimum lateral width 290.

In some embodiments of the present disclosure, a ratio of the maximum lateral width 288 to the minimum lateral width 290 may range from 1.1 to 1.3. In such a case, the maximum lateral width 288 may range from 200.0 mm to 250.0 mm (e.g., 223.3 mm) and the minimum lateral width ranges from 180.0 mm to 190.0 mm (e.g., about 186.0 mm). Other ratios and dimensional ranges are possible in other embodiments of the present disclosure.

With continued reference to FIG. 4, it may be understood that the midplane 222 may essentially be a plane of symmetry for the track chain member or track pad. So, the second bottom void 244 may be symmetrical to the first bottom void 224 about the midplane 222, but not necessarily so (e.g., may be disposed asymmetrically about the midplane, etc.). Also, the first side recess 272, and the second side recess 284 do not extend to the ground engaging surface 214, providing more surface area to limit penetration into the ground. This may not be the case for other embodiments of the present disclosure.

Looking more closely at the first top surface 266, this surface extends laterally past the second lug 264, and at least partially laterally above the first bottom void 224. Likewise, the second top surface 278 extends laterally past the fourth lug 276, and at least partially above the second bottom void 244. Either of these top surfaces may dip vertically toward a bottom void, defining a minimum thickness 292 between the top surface and the bottom void that is greater than 45.0 mm in some embodiments (e.g., may be greater than 50.0 mm). This may not be the case for other embodiments of the present disclosure.

An embodiment of the track chain member may also be described as follows with reference to FIG. 4. The first bottom void 224 may at least partially form a first pillar sidewall 294, and the second bottom void 244 may at least partially form a second pillar sidewall 294a (may be symmetrical to 294 about the midplane 222) in the cross-sectional plane (i.e., the cross-sectioned plane of FIG. 4). The first pillar sidewall 294 may include a convex blend 296 (a blend may be any curved surface that is not straight, e.g., a radius, an ellipse, a polynomial, a spline, a sinusoidal curve, etc.) that extends vertically from the ground engaging surface 214, and a concave blend (e.g., see 238) that extends vertically from the convex blend 296 (may be directly tangential to the convex blend).

The convex blend 296 may define a radius of curvature R296 in the cross-sectional plane, and the support pillar 246 may define a planar support portion 298 of the ground engaging surface 214 that defines a planar support lateral width W298 at the ground engaging surface. A ratio of the planar support lateral width W298 o the radius of curvature ranges R296 may range from 4.0 to 6.0 in some embodiments of the present disclosure. In such a case, the planar support lateral width may be greater than 200.0 mm (e.g., greater than about 233.0 mm), and the radius of curvature is greater than 40.0 mm (e.g., greater than about 50.0 mm).

The first side recess 272 also extends from the exterior of the shoe member and underneath the first top surface 266 toward the first bottom void 224, defining a minimum wall thickness 299 in the cross-sectional plane between the first side recess 272 and the first bottom void 224. A ratio of the minimum wall thickness 299 to the radius of curvature 8296 may range from 0.8 to 1.6 in some embodiments of the present disclosure. The minimum wall thickness 299 may be greater than 60.0 mm in some embodiments.

The support pillar may define a support pillar height, and a portion of the support pillar, such as the upper hardened region may define an upper hardened region height where a ratio of the upper hardened region height to the support pillar height may range from 10% to 25%. Hardening may be performed via induction hardening, etc. The support pillar height may range from 275 mm to 325 mm, and the support pillar width may range from 180 mm to 250 mm in some embodiments of the present disclosure.

It should be noted that the support pillar may contain a void extending completely through the support pillar along the track traveling direction, but not necessarily so. In such a case, this void is to be ignored when considering the dimensions and ratios mentioned herein with regard to any support pillar discussed herein.

Again, for any of the embodiments discussed herein, the values of dimensions, angles, and ratios may be varied to be different than anything shown in FIGS. 2 thru 7. Also, various features may be modified in configuration or omitted in various embodiments of the present disclosure, etc.

INDUSTRIAL APPLICABILITY

In practice, a track chain assembly, track chain member, a track pad, a shoe member, and/or machine may be sold, manufactured, bought etc. and in the aftermarket or original equipment scenarios according to any of the embodiments discussed herein. That is to say, the machine may be sold with the track chain assembly, and/or track chain member, track pad, shoe member, etc. according to embodiments described herein or the machine may be retrofitted, repaired, refurbished to use any of the embodiments discussed herein. The various components including, but not limited to the track chain members, may be manufactured from any suitable material such as cast iron, grey cast iron, steel, manganese, etc. The track chain member may be initially cast or forged and then additional features may be machined on the track chain member. For example, the bores of the lugs may be machined.

In one particular application, it has been determined that a particular material such with a higher content of carbon may be more durable when used but may be more prone to crack. This may be referred to as a "high carbon steel alloy" that includes a carbon content of 0.55 percent or higher, or one part in 180. Typically, the carbon content is less than 2.0 percent to avoid embrittlement.

In a particular embodiment, a track pad according to an embodiment of the present disclosure may provide a design that helps prevent excessive plastic deformation along a roller path of a track shoe in electric rope shovel machine. Current design of the track shoe includes two internal cavities along the center of shoe. A single rib at the center of the track shoe is the only supporting structure for the rolling path.

More particularly, the present disclosure pertains to change in material and geometry of a track shoe (and more specifically for a track pad) employed by an electric rope shovel machine. The new material is a carbon alloy that provides induction hardening on the roller path (any portion of the track pad or track chain member may be induction hardened). The new geometry may include a solid structure in center of shoe with a continuous surface and may eliminate any internal cavity along the core of the track shoe. The geometry may provide enough strength to carry the weight of the machine and allow the complete inspection of the roller path of the track shoe while on the machine. Put another way, the track pad or the track chain member may lack any thru-apertures that extend laterally or along the track chain traveling direction to the first bottom void, or vertically downward to the first bottom void, etc.

Such a track pad is shown in FIGS. 2 thru 7. As shown, the track pad may be constructed from unitary piece of materials that is cast and then machine as previously alluded to herein.

Figure 2:
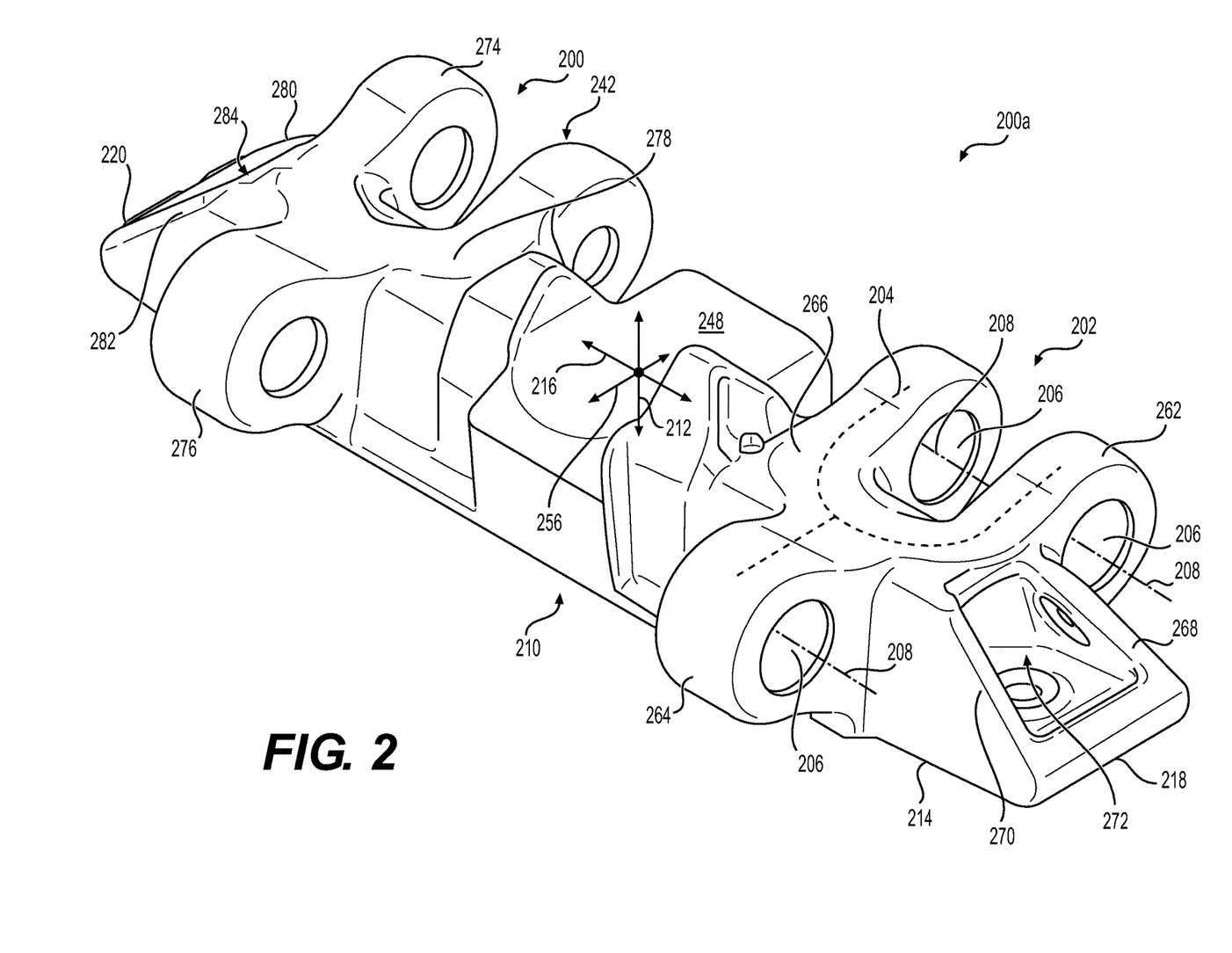
FIG. 2 is a perspective view of a track shoe or track pad according to an embodiment of the present disclosure that may be used with the machine of FIG. 1.

The track pad 200 may comprise a first link portion 202 defining a Y-shaped set 204 of lugs each defining a bore 206 with a cylindrical axis 208 that is parallel to each other. Hence, these bores may be aligned with the bores of other link portions of other track pads to form a track chain assembly. It is to be understood that this first link portion is so called since it functions to mate with the link portion of an adjacent track pad, and then be attached to the adjacent track pad by inserting a pin and/or a bushing in the bores of the link portions, sequentially forming a track chain assembly.

A shoe member portion 210 may extend from the first link portion, downward along a vertical direction 212 that is perpendicular to each cylindrical axis 208 toward a ground engaging surface 214. The ground engaging surface 214 extends along a lateral direction 216 that is parallel to each cylindrical axis 208 to form a first lateral extremity 218, and a second lateral extremity 220. A midplane 222 may be disposed laterally halfway between the first lateral extremity 218, and the second lateral extremity 220.

As best seen in FIG. 4, the ground engaging surface 214 may define a first bottom void 224 defining a first lateral contour 226, and a second lateral contour 228 in a cross-sectional plane (i.e., the cross-sectioned plane of FIG. 4) including the lateral direction 216, and the vertical direction 212. The first lateral contour 226 is disposed proximate to the first lateral extremity 218, while the second lateral contour 228 is disposed near the midplane 222. The first lateral contour 226 jogs laterally and vertically, defining a first vertical undercut 230, and the second lateral contour 228 also jogs laterally and vertically, defining a second vertical undercut 232 that is disposed at a vertical level higher than the first vertical undercut 230 (as indicated by the angled contour line 234 connecting the first vertical undercut 230 to the second vertical undercut 232).

In addition, the first vertical undercut may define a first undercut lateral width W230, and the second vertical undercut may define a second lateral undercut width W232 that is greater than the first lateral undercut width W230. This may be attributed to the fact that the radius of curvature of the first concave segment 236 forming the first vertical undercut is greater than that of the second concave segment 238 forming the second vertical undercut. Hence, it may be understood that the wall that forms a bottom void of the track pad may vary along its oval perimeter 240, 240a (see also FIGS. 6 and 7). Other configurations are possible in other embodiments of the present disclosure.

Looking at FIGS. 3 and 4 together, a second link portion 242 may be provided that is symmetrical to the first link portion 202 about the midplane 222, as well as a second bottom void 244 that is symmetrical to the first bottom void 224 about the midplane 222, forming a support pillar 246 that is directly under the roller path 248. The support pillar may have a first serpentine edge 250 (e.g., may be S-shaped) disposed laterally on one side of the midplane 222 in the cross-sectional plane of FIG. 4, and a second serpentine edge 252 disposed laterally on the other side of the midplane in the cross-sectional plane of FIG. 4.

Finite element analysis performed by the inventors of the present disclosure has revealed that this shape of the support pillar directly underneath the roller path, which may be induction hardened, is strong enough to resist cracking under high loads exerted by a roller of a machine on the track pad.

Also, it should be noted that the roller path is not directly vertically above either bottom void or its sidewalls. That is to say, the bottom voids are spaced laterally away from any lateral extremity of the roller path so that the support pillar conveys the load downwardly efficiently. As a result, as the support pillar becomes worn or thinner vertically, the stress within the bottom void does not change significantly. Put another way, the first serpentine edge and the second serpentine edge are not directly vertically underneath the roller path (i.e., they are spaced laterally away from the nearest lateral extremity of the roller path).

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain member comprising:
   a shoe member defining a track chain traveling direction, a lateral direction perpendicular to the track chain traveling direction, and a vertical direction that is perpendicular to the track chain traveling direction, and the lateral direction, the shoe member further defining a first lateral end, a second lateral end, and a ground engaging surface spanning from the first lateral end to the second lateral end; and
   the track chain member further defining a midplane along the lateral direction, a first bottom void extending from the ground engaging surface and a second bottom void extending from the ground engaging surface, the first bottom void being disposed on one side laterally of the midplane and the second bottom void being disposed on the other side laterally of the midplane, forming a support pillar therebetween;
   wherein the first bottom void at least partially forms a first pillar sidewall, and the second bottom void at least partially forms a second pillar sidewall in a cross-sectional plane having the lateral and the vertical directions, and the first pillar sidewall includes a convex blend that extends vertically from the ground engaging surface, and a concave blend that extends vertically from the convex blend and extends laterally of the convex blend in a direction of the midplane.

2. The track chain member of claim 1, wherein the track chain member further defines a roller path disposed vertically above the midplane, the first bottom void and the second bottom void are disposed about the midplane, and are not disposed vertically underneath the roller path.

3. The track chain member of claim 2, wherein the convex blend defines a radius of curvature in the cross-sectional plane, and the support pillar defines a planar support portion of the ground engaging surface that defines a planar support lateral width at the ground engaging surface, and a ratio of the planar support lateral width to the radius of curvature ranges from 4.0 to 6.0.

4. The track chain member of claim 3, wherein the planar support lateral width is greater than 200.0 mm, and the radius of curvature is greater than 40.0 mm.

5. The track chain member of claim 4 further comprising:
   a first lug extending from the shoe member in a first direction parallel to the track chain traveling direction;
   a second lug extending from the shoe member in a second direction parallel to the track chain traveling direction and opposite to the first direction;
   the track chain member further defining a first top surface spanning from the first lug to the second lug;
   a first rib coupling the shoe member to the first lug; and
   a second rib coupling the shoe member to the second lug, defining a first side recess between the first rib and the second rib, the first side recess also extending from the exterior of the shoe member and underneath the first top surface toward the first bottom void, defining a minimum wall thickness in the cross-sectional plane between the first side recess and the first bottom void, and a ratio of the minimum wall thickness to the radius of curvature ranges from 0.8 to 1.6.

6. A track chain member comprising:
   a shoe member defining a track chain traveling direction, a lateral direction perpendicular to the track chain traveling direction, and a vertical direction that is perpendicular to the track chain traveling direction, and the lateral direction, the shoe member further defining a first lateral end, a second lateral end, and a ground engaging surface spanning from the first lateral end to the second lateral end; and
   the track chain member further defining a midplane along the lateral direction, a first bottom void extending from the ground engaging surface and a second bottom void extending from the ground engaging surface, the first bottom void being disposed on one side laterally of the midplane, and the second bottom void being disposed on the other side laterally of the midplane, forming a support pillar therebetween;
   wherein at least the first bottom void defines an elliptical perimeter at the ground engaging surface; and
   wherein the track chain member is a unitary piece formed as a casting or a forging.

7. The track chain member of claim 6 further comprising:
   a first lug extending from the shoe member in a first direction parallel to the track chain traveling direction;
   a second lug extending from the shoe member in a second direction parallel to the track chain traveling direction and opposite to the first direction;

the track chain member further defining a first top surface spanning from the first lug to the second lug;
a first rib coupling the shoe member to the first lug; and
a second rib coupling the shoe member to the second lug, defining a first side recess between the first rib and the second rib, the first side recess also extending from the exterior of the shoe member and underneath the first top surface.

8. The track chain member of claim 7 further comprising:
a third lug extending from the shoe member in the first direction parallel to the track chain traveling direction;
a fourth lug extending from the shoe member in the second direction parallel to the track chain traveling direction and opposite to the first direction;
the track chain member further defining a second top surface spanning from the third lug to the fourth lug;
a third rib coupling the shoe member to the third lug; and
a fourth rib coupling the shoe member to the fourth lug, defining a second side recess between the third rib and the fourth rib, the second side recess also extending from the exterior of the shoe member and underneath the second top surface.

9. The track chain member of claim 6, wherein the elliptical perimeter of the first bottom void defines a major axis that runs parallel to the lateral direction, and a minor axis that runs parallel to the track chain traveling direction.

10. The track chain member of claim 9, wherein the shoe member further comprises a first void sidewall of the first bottom void that jogs laterally while extending vertically, forming an undercut along the vertical direction.

11. The track chain member of claim 10, wherein the first bottom void defines a maximum lateral width, the undercut defines a minimum lateral width, and a ratio of the maximum lateral width to the minimum lateral width ranges from 1.1 to 1.3.

12. The track chain member of claim 11, wherein the maximum lateral width ranges from 200.0 mm to 250.0 mm and the minimum lateral width ranges from 180.0 mm to 190.0 mm.

13. The track chain member of claim 6, comprising a high carbon alloy steel.

14. The track chain member of claim 13, wherein the track chain member is at least partially induction hardened.

15. The track chain member of claim 13, wherein the track chain member lacks any thru-apertures that extend laterally or along the track chain traveling direction to the first bottom void, or vertically downward to the first bottom void.

16. The track chain member of claim 8, wherein the second bottom void is symmetrical to the first bottom void about the midplane.

17. The track chain member of claim 8, wherein the first side recess and the second side recess do not extend to the ground engaging surface.

18. The track chain member of claim 16, wherein the first top surface extends laterally past the second lug and at least partially laterally above the first bottom void, and the second top surface extends laterally past the fourth lug and at least partially above the second bottom void, and the first top surface dips vertically toward the first bottom void, defining a minimum thickness between the first top surface and the first bottom void that is greater than 45.0 mm.

19. A track pad comprising:
a first link portion defining a Y-shaped set of lugs each defining a bore with a cylindrical axis that is parallel to each other; and
a shoe member portion extending from the first link portion, downward along a vertical direction that is perpendicular to each cylindrical axis toward a ground engaging surface, and the ground engaging surface extending along a lateral direction that is parallel to each cylindrical axis to form a first lateral extremity, and a second lateral extremity, and further defining a midplane disposed laterally halfway between the first lateral extremity, and the second lateral extremity;
wherein the ground engaging surface defines a first bottom void defining a first lateral contour and a second lateral contour in a cross-sectional plane including the lateral direction, and the vertical direction, the first lateral contour being disposed relatively more proximate to the first lateral extremity than to the midplane, and the second lateral contour being disposed relatively more proximate to the midplane than to the first lateral extremity, the first lateral contour defining a first vertical undercut, the second lateral contour defining a second vertical undercut that is disposed at a vertical level higher than the first vertical undercut, the first vertical undercut defining a first undercut lateral width, and the second vertical undercut defining a second lateral undercut width that is greater than the first lateral undercut width.

20. The track pad of claim 19, further comprising a second link portion that is symmetrical to the first link portion about the midplane, a roller path disposed laterally between the first link portion, and the second link portion, and a second bottom void that is symmetrical to the first bottom void about the midplane, forming a support pillar having a first serpentine edge disposed laterally on one side of the midplane in the cross-sectional plane, and a second serpentine edge disposed laterally on the other side of the midplane in the cross-sectional plane such that the first serpentine edge is not vertically underneath the roller path, and the second serpentine edge is not vertically underneath the roller path.

* * * * *